Feb. 20, 1951 A. J. TROYER 2,542,885
PORTABLE CONVEYER
Filed May 22, 1947
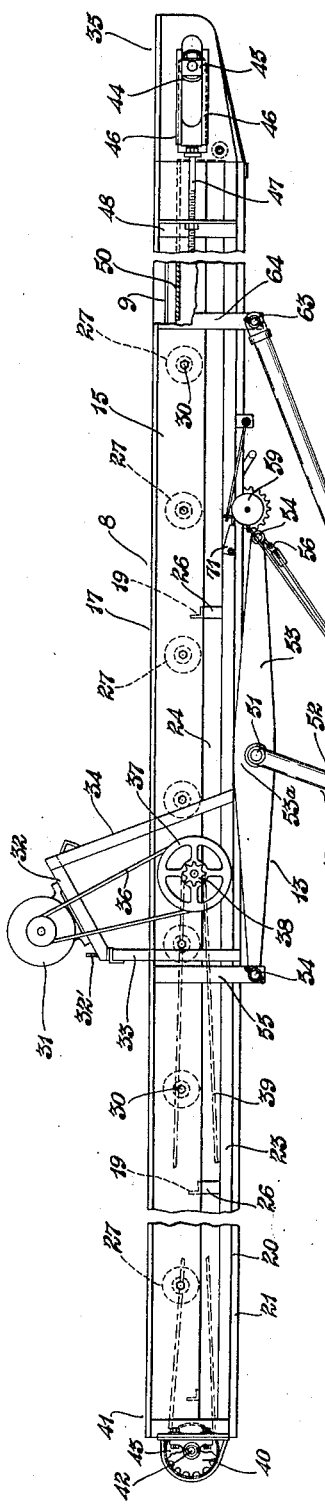
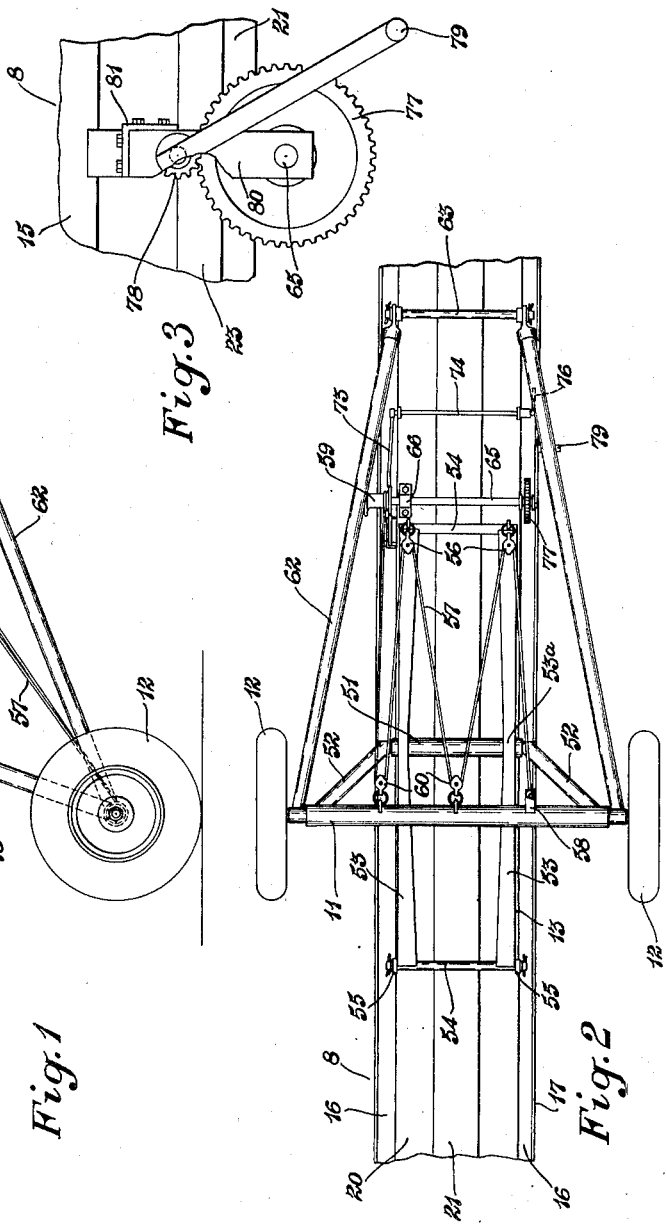
Inventor
Abner J. Troyer
By Frease and Bishop
Attorneys Feb. 20, 1951     A. J. TROYER     2,542,885
PORTABLE CONVEYER
Filed May 22, 1947     2 Sheets-Sheet 2
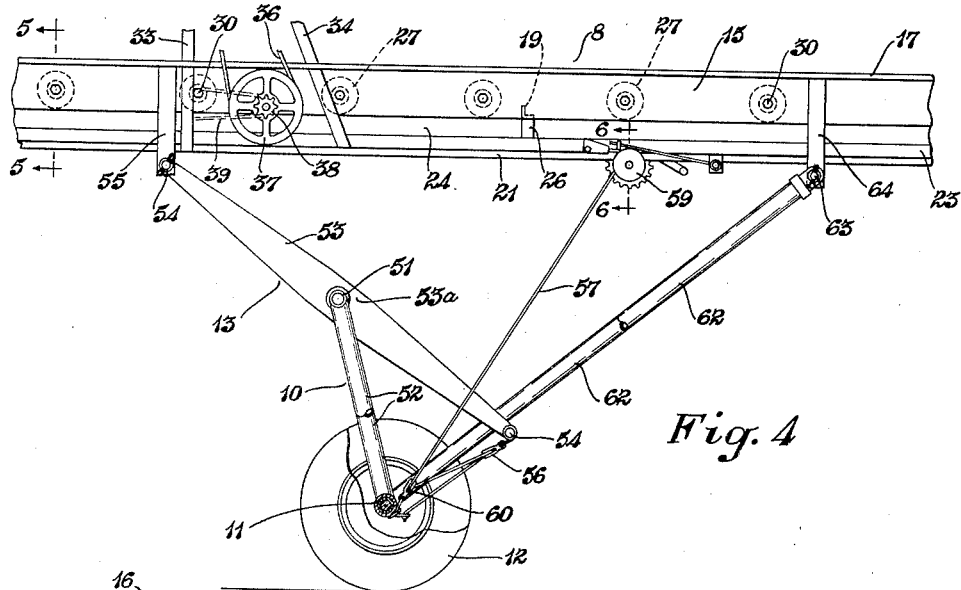
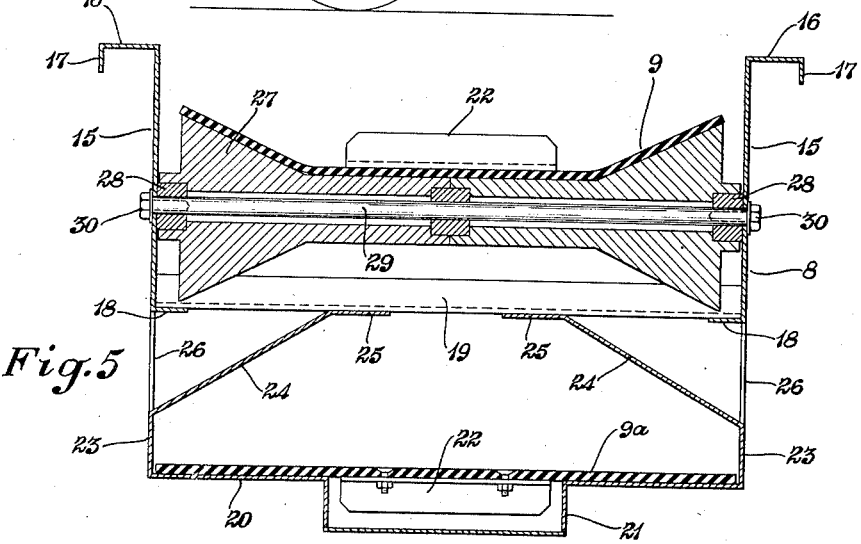
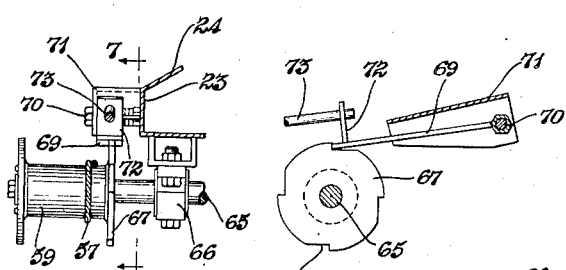
Inventor
Abner J. Troyer
By Frease and Bishop
Attorneys Patented Feb. 20, 1951

2,542,885

UNITED STATES PATENT OFFICE 2,542,885

PORTABLE CONVEYER

Abner J. Troyer, Smithville, Ohio

Application May 22, 1947, Serial No. 749,832

5 Claims. (Cl. 198—233)

The invention relates generally to endless belt conveyors, and more particularly to a novel portable and adjustable conveyor which is particularly adapted for unloading material from freight cars or onto trucks under a variety of conditions.

Certain prior portable conveyors have been heavy and cumbersome to manipulate and have embodied a derrick or similar superstructure for raising and lowering the conveyor to meet loading conditions. Such superstructure not only makes the conveyor top heavy and unwieldy but increases the overhead clearance required in moving or transporting the conveyor through doors or under overhead obstructions.

These prior conveyors have the further disadvantage of being somewhat unstable on uneven ground, especially when in raised position. Moreover, in transporting or towing such conveyors over rough roads, the shocks or impact loads on the conveyor are very apt to damage the lifting mechanism.

In order to make the conveyor boom strong enough to meet all conditions, the booms of such prior conveyors include heavy structural members with a large amount of cross bracing, as for example, in a lattice arrangement. Such structures not only make the conveyor heavy and unwieldy, but greatly increase the load required to be raised by the lifting mechanism and add to the instability of the conveyor by raising its center of gravity.

It is an object of the present invention to provide a novel portable conveyor having a strong and rigid boom of minimum weight.

Another object is to provide a novel portable conveyor having a lifting mechanism located entirely below the boom, thereby lowering the center of gravity and decreasing the overhead clearance required.

Another object is to provide a portable conveyor having a novel lifting mechanism which is so constructed as to transfer the weight of the conveyor in lowered position directly to the axle, so that the lifting mechanism is not subjected to shocks or impacts when the conveyor is being transported.

A further object is to provide a novel portable conveyor which has increased stability in raised position, thereby substantially eliminating side sway.

Another object is to provide an improved portable conveyor having a novel boom construction providing support for stationary and moving functional parts which in turn contribute to the strength and rigidity of the boom without requiring additional reinforcing members.

A further object is to provide an improved portable conveyor having a novel boom construction for protecting the return run of the belt from falling material, and for imparting increased rigidity to the boom.

A still further object is to provide an improved portable conveyor having a novel lever lifting mechanism which enables the location of such mechanism entirely below the boom, and which transfers a large proportion of the weight directly to the axle as the lifting mechanism approaches fully raised position.

Finally, it is an object of the present invention to incorporate all of the foregoing objectives in a compact and light weight portable conveyor construction which is inexpensive to manufacture, operate and maintain.

These and other objects are accomplished by the parts, constructions, arrangements and combinations which comprise the present invention, the nature of which is set forth in the following general statement, and a preferred embodiment of which is set forth in the following description and illustrated in the accompanying drawings, and which is particularly pointed out and set forth in the appended claims.

In general terms, the novel portable conveyor comprising the present invention may be stated as including an elongated conveyor boom supported intermediate its ends on a lever lifting mechanism carried on an axle having a pair of wheels for supporting the conveyor on the ground, the lifting mechanism including a fulcrum frame supporting the lever on the axle, and cable and winch means for operating the lever to raise the boom; the conveyor boom having a welded box construction with belt rollers journaled in its upper side walls, a bottom wall supporting the return run of the belt, and angular deflector walls strengthening the boom and protecting the return run of the belt from material falling over the ends of the rollers.

Referring to the drawings in which a preferred embodiment of the invention is shown by way of example;

Figure 1 is a side elevational view, with parts broken away and in section, showing the novel conveyor with the boom in lowered horizontal position for being transported;

Fig. 2 is a fragmentary bottom plan view thereof;

Fig. 3 is an enlarged fragmentary elevation looking at the side opposite from that shown in Fig. 1, showing the crank handle for manually operating the lifting mechanism;

Fig. 4 is a fragmentary side elevational view similar to Fig. 1, showing the boom in raised position;

Fig. 5 is a transverse sectional view of the conveyor boom, taken substantially on line 5—5, Fig. 4;

Fig. 6 is an enlarged fragmentary sectional view as on line 6—6, Fig. 4; and

Fig. 7 is a sectional view as on line 7—7, Fig. 6.

Similar numerals refer to similar parts throughout the several views of the drawings.

The novel conveyor is particularly well adapted for unloading granular or pulverized material such as lime and gravel from freight cars to a stock pile or onto a truck or the like. In such case, the loading end of the conveyor boom is positioned under the freight car with the conveyor preferably sloping upwardly to the unloading end so that the material falls from the freight car onto the conveyor and is conveyed upwardly to fall from its discharge end onto a stock pile or into a truck body. Alternately, the material may be carried from under the freight car by an unloading conveyor which dumps onto the loading end of the novel portable conveyor of the present invention. Variations in using the present portable conveyor will be apparent, as the conveyor boom might be sloped downwardly to unload from a truck body to the ground or it might be used in a horizontal position as shown in Figs. 1 and 4 for loading material from a loading platform into a truck or vice versa.

The novel portable conveyor includes an elongated conveyor boom indicated generally at 8, supporting an endless belt 9, the boom being supported intermediate its ends on an upright fulcrum frame indicated generally at 10, rotatably carried on the axle 11 rollably supported by the wheels 12. Between the frame 10 and the boom 8, a lever lift 13 is interposed for adjusting the height of the boom to suit varying conditions.

As shown in Fig. 5, the conveyor boom is preferably made of light gauge steel in a welded box construction, and includes longitudinal vertical side members 15 having at their upper edges horizontal flange portions 16 terminating in downturned edge portions 17. The lower edges of the side members 15 have inturned flanges 18 which support transverse spacer angles 19 at intervals along the length of the boom. The bottom wall 20 of the boom slidably supports the return run 9a of the conveyor belt, and has a central longitudinal trough or channel 21 formed therein for housing the angle flights 22 secured to the conveyor belt.

Longitudinal side plates 23 extend upwardly from each edge of the bottom wall at a working clearance from the belt, and the side plates are bent inwardly to form deflector walls 24 extending angularly inward and upward and terminating at their inner ends in horizontal flanges 25 which are secured to the transverse angles 19, as by welding. These deflector walls 24 not only serve to brace the conveyor boom and make it strong and rigid, but at the same time they serve to deflect outwardly any material falling over the edges of the upper run 9 of the belt and thus prevent it from falling on the return run 9a. Protecting the inner surface of the return run of the belt from falling material is very important, because otherwise such material will build up on the tail pulley and will enlarge the same to the extent of damaging the belt, as by tearing the lacing hooks out of the same.

The provision of the protective trough 21 for the flights on the return run of the belt is also very important because in using a portable conveyor with such flights exposed the moving flights are extremely dangerous and are very apt to damage other equipment as well as to cause damage to the driving mechanism of the conveyor if they become jammed.

The side members 15 are preferably connected directly to the side plates 23 at longitudinal intervals by straps 26 welded thereto and located preferably opposite the ends of the transverse angles 19. Thus, between the straps 26 longitudinal openings extend substantially throughout the length of the conveyor boom for discharging any material which falls from the outer edges of the upper run of the belt 9 onto the deflecting plates 24, and the plates 24 at the same time strengthen the boom throughout its length.

The upper run 9 of the conveyor belt is supported throughout the length of the boom by suitable rollers 27 which preferably have conical ends to carry the upper run of the belt in a somewhat trough-like shape, in a well-known fashion. As shown, the ends of the rollers have suitable bearings 28 mounted therein for journaling the rollers on transverse shafts 29, the ends of which are rigidly secured to the side members 15 of the boom, as by cap screws 30. With this type of journal mounting, the shafts 29 provide additional transverse spacer bars for the side members of the boom, thus serving the dual purpose of journaling the rollers and stiffening the boom.

The means for driving the conveyor belt may include an electric motor 31 supported on a platform 32 which is carried on legs 33 and 34 secured as by welding to the side members 15 and 23 of the conveyor boom. The platform 32 for the motor is preferably inclined so that when the loading end 35 of the conveyor is tipped downwardly in normal operating position, the platform will be substantially horizontal. One side of the platform 32 may have an adjusting screw 32' for adjusting the inclination of the platform. While an electric motor 31 is shown, it will be understood that any suitable driving motor, as for instance a gasoline motor, can be used.

The driving motor is operatively connected as by a belt 36 to a pulley 37 mounted on one side of the conveyor boom and having a driving pinion 38 thereon. The driving pinion 38 is operatively connected by a chain indicated at 39 to a driving sprocket 40 at the discharge end 41 of the conveyor. In order to further reduce the speed of the driving sprocket 40, the chain 39 may be connected to a usual speed-reducing sprocket cluster (not shown) which is in turn connected to the driving sprocket 40.

The driving sprocket 40 is preferably mounted on a shaft 42 which carries the belt driving pulley 43 at the discharge end of the boom, and at the loading end of the boom, a belt tail pulley 44 is journaled in an adjustable bearing mounting 45 adapted for taking up the slack in the belt. The adjustable bearings 45 are slidably mounted in a usual fashion in guides 46 on the sides of the boom, and the bearings are adjustable by means of adjusting bolts 47 screwed in the flanges of angles 48 secured to the sides of the conveyor boom.

Between the tail pulley 44 and the adjacent belt roller 27, a shock plate 50 underlies the belt, because this area of the belt is the loading area where the belt receives its most severe shocks and impacts. The shock plate 50 is welded at its edges to the side members 15 and is located immediately under the belt so as to slidably support the same. The shock plate 50 accordingly provides a rigid bed of sufficient strength to withstand the shock of any load or overload dumped on the belt, and since it is welded to the side members 15 to become an integral part of the boom, it adds strength and rigidity at the loading end of the boom, where the boom receives the most severe use and abuse while in service.

The lever frame 13 is preferably rectangular and journaled intermediate its ends on a transverse shaft 51 which is connected at its ends to the inwardly inclined side members 52 of the upright fulcrum frame supported on the axle 11. The side members 53 of the lever frame are widened vertically at their central intermediate portions 53a to increase their strength vertically, and are widened horizontally at their outer ends at the points where they are attached as by welding to transverse end rods 54.

The front transverse bar 54 of the lever frame is journaled at its ends in the bottom ends of anchoring bars 55 welded to the opposite side members of the boom and depending below the same. The rear transverse rod 54 of the lever frame has spaced pulley blocks 56 secured thereto for supporting the upper reaches of a cable 57 one end of which is secured at 58 to the axle 11 and the other end of which is wound about a winch 59 mounted on the conveyor boom, the cable being passed in series over the pulleys 56 and pulleys 60 secured on the axle 11. The axle 11 is connected as by welding at its outer ends to the lower ends of anchor bars 62 which extend rearwardly and have their upper ends pivoted on a transverse shaft 63 which is mounted in the lower ends of vertical anchor bars 64 preferably welded to the sides of the conveyor boom at a substantial distance from the front anchor bars 55. Thus, in raised position such as shown in Fig. 4, the axle 11 is connected to widely spaced anchor bars 55 and 64 on the conveyor boom, to prevent side sway and provide a very stable support for the conveyor boom. Due to this stable construction the lifting mechanism can operate to raise the boom easily without binding even though the conveyor is located on uneven ground or subjected to lateral loads.

The winch 59, on which the upper end of the cable 57 is wound, is preferably mounted on a transverse shaft 65 mounted in a suitable bearing 66 on the underside of the boom. As shown in Figs. 6 and 7, one flange 67 of the winch is provided with a series of peripheral notches 68 for being engaged by one end of a ratchet bar 69, the other end of which is pivotally connected to a bolt 70 securing an angular guard plate 71 to the side plate 23 of the boom. A latch 72 normally holds the ratchet bar 69 in engagement with one of the notches 68, to lock the cable in adjusted position, so that the winch 59 will not unwind but will permit the ratchet bar 69 to slide over the notches 68 when the winch is turned to wind up the cable. In order to release the latch 72 to allow the winch to turn in the opposite direction for unwinding the cable, the latch is connected to a lever arm 73 for raising the same, and preferably the lever arm 73 is connected to a cross shaft 74 having a handle 76 on the opposite end, so as to be conveniently located adjacent to the crank end of the winch shaft 65.

As best shown in Figs. 2 and 3, the end of the shaft 65 opposite to the winch 59 has a gear 77 thereon meshing with a pinion 78, and the pinion is adapted to be rotated by a crank 79 secured thereto. The end of the gear shaft 65 and the pinion shaft may be journaled in a depending bar 80, the upper end of which is secured to an angle bracket 81 mounted on the side of the boom.

As indicated in Fig. 1, when the conveyor boom is in fully lowered position, the widened central portions 53a of the cantilever members 53 abut the bottom wall 20 of the boom so as to transmit the full load of the conveyor boom through the fulcrum frame 10 directly to the axle 11. Accordingly, when the conveyor is transported in fully lowered position, the cable 57 is not subjected to any shocks or strains which would tend to snap the cable, especially in traveling over bumpy roads.

As shown in Fig. 4, as the conveyor boom 8 approaches fully raised position, the lever frame 13 approaches alignment with the fulcrum frame 10 so as to transmit a large proportion of the load of the boom through the fulcrum frame directly to the axle and thus relieve the strain on the cable and pulley system.

The novel portable conveyor is extremely compact and light in weight due to the welded box construction and the minimum number of additional transverse braces required in the boom, and the conveyor is accordingly very inexpensive to manufacsure and easy to operate and maintain. The novel lifting mechanism is located entirely below the boom at all times, which lowers the center of gravity of the conveyor, increases its stability and decreases the amount of overhead clearance required in transporting the conveyor through doors and under overhead obstructions.

The novel conveyor comprises an easily portable conveying unit which is readily adapted to meet a wide variety of loading conditions and which combines maximum strength, rigidity and stability with a minimum of weight.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use, and a preferred embodiment thereof, and the advantageous new and useful results obtained thereby; the new and useful constructions, and reasonable mechanical equivalents thereof obvious to those skilled in the art, are set forth in the appended claims.

I claim:

1. A portable conveyor including an elongated conveyor boom, an endless belt movably mounted in said boom, a lever member located under the boom and pivotally connected at one end to an intermediate portion of said boom, an axle having wheels for rollably supporting the conveyor, a substantially upright frame pivotally supported at its lower end directly on said axle and having its upper end pivotally connected to the central portion of said lever member, inclined anchor bars pivotally connecting said axle to said boom at a location spaced longitudinally from the connection of said boom and lever member, and means for rotating the free end of the lever member about its central pivot on the frame to raise the boom.

2. A portable conveyor including an elongated conveyor boom, an endless belt movably mounted in said boom, a lever member located under the boom and pivotally connected at one end to an intermediate portion of said boom, an axle having wheels for rollably supporting the conveyor, a substantially upright frame pivotally supported at its lower end directly on said axle and having its upper end pivotally connected to the central portion of said lever member, inclined anchor bars pivotally connecting said axle to said boom at a location spaced longitudinally from the connection of said boom and lever member, and cable and winch means for rotating the free end of the lever member about its central pivot on the frame to raise the boom.

3. A portable conveyor including an elongated conveyor boom, an endless belt movably mounted in said boom, a lever member located under the boom and pivotally connected at one end to an intermediate portion of said boom, an axle having wheels for rollably supporting the conveyor, a substantially upright frame pivotally supported at its lower end directly on said axle and having its upper end pivotally connected to the central portion of said lever member, inclined anchor bars pivotally connecting said axle to said boom at a location spaced longitudinally from the connection of said boom and lever member, pulleys on the axle and the free end of said lever member, a cable passing over said pulleys in series, and a winch on said boom for winding the cable to raise the boom.

4. A portable normally horizontal conveyor including an elongated conveyor boom, an axle having wheels rollably supporting said conveyor, a substantially upright frame pivotally supported at its lower end directly on said axle, an inclined anchor bar pivotally connecting said axle to an intermediate portion of said boom, a lever member located under the boom and pivoted at its central portion on the upper end of said frame, one end of said lever member being pivotally connected to said boom at an intermediate location spaced longitudinally from the connection between said boom and anchor bar, means for rotating the free end of said lever member downwardly about its central pivot to raise the boom in substantially horizontal position, and the central portion of said lever member abutting said boom in its fully lowered position.

5. A portable normally horizontal conveyor including an elongated conveyor boom, an axle having wheels rollably supporting said conveyor, a substantially upright frame pivotally supported at its lower end directly on said axle, an inclined anchor bar pivotally connecting said axle to an intermediate portion of said boom, a lever member located under the boom and pivoted at its central portion on the upper end of said frame, one end of said lever member being pivotally connected to said boom at an intermediate location spaced longitudinally from the connection between said boom and anchor bar, and means for rotating the free end of said lever member downwardly toward said axle to raise the boom in substantially horizontal position, said lever member abutting said boom in fully lowered position and approaching alignment with said frame in fully raised position for supporting said boom substantially directly on said axle in both positions.

ABNER J. TROYER.

REFERENCES CITED

The following references are of record in the file of this patent:

UNITED STATES PATENTS

| Number | Name | Date |
| --- | --- | --- |
| Re. 17,160 | Barber | Dec. 11, 1928 |
| 676,504 | Kassel | June 18, 1901 |
| 681,147 | Stone | Aug. 20, 1901 |
| 1,511,060 | Miller | Oct. 7, 1924 |
| 1,928,190 | Thomson | Sept. 26, 1933 |
| 2,254,181 | Joy | Aug. 26, 1941 |
| 2,444,521 | Mulkey et al. | July 6, 1948 |